United States Patent
Sivinski et al.

(10) Patent No.: US 12,052,944 B2
(45) Date of Patent: Aug. 6, 2024

(54) ROTATIONAL SPEED SENSORS FOR AGRICULTURAL SEED PLANTER

(71) Applicant: Harvest International, Inc., Storm Lake, IA (US)

(72) Inventors: Jeffrey Alan Sivinski, Cherokee, IA (US); Byron James Friesen, Storm Lake, IA (US)

(73) Assignee: Harvest International, Inc., Storm Lake, IA (US)

( * ) Notice: Subject to any disclaimer, the term of this patent is extended or adjusted under 35 U.S.C. 154(b) by 902 days.

(21) Appl. No.: 16/949,553

(22) Filed: Nov. 3, 2020

(65) Prior Publication Data
US 2022/0132725 A1 May 5, 2022

(51) Int. Cl.
| | |
|---|---|
| *A01C 5/06* | (2006.01) |
| *A01B 79/00* | (2006.01) |
| *A01C 7/08* | (2006.01) |
| *A01C 7/20* | (2006.01) |
| *G01P 3/00* | (2006.01) |

(52) U.S. Cl.
CPC .......... *A01C 5/064* (2013.01); *A01B 79/005* (2013.01); *A01C 7/08* (2013.01); *A01C 7/208* (2013.01); *G01P 3/00* (2013.01)

(58) Field of Classification Search
CPC .......... A01C 5/064; A01C 7/08; A01C 7/208; G01P 3/00; A01B 79/005
See application file for complete search history.

(56) References Cited

U.S. PATENT DOCUMENTS

| | | | | | |
|---|---|---|---|---|---|
| 2,978,599 | A | * | 4/1961 | Wilcox | G01P 3/488 341/15 |
| 4,011,478 | A | * | 3/1977 | Reenstra | G01P 3/488 310/155 |
| 4,384,252 | A | * | 5/1983 | Kolter | G01P 3/488 324/207.16 |
| 5,003,259 | A | * | 3/1991 | Palazzetti | G01P 3/488 324/207.25 |
| 9,485,900 | B2 | * | 11/2016 | Connell | A01B 63/24 |
| 11,039,565 | B2 | * | 6/2021 | Schoeny | A01B 79/005 |
| 11,246,257 | B2 | * | 2/2022 | Stanhope | A01C 5/068 |
| 11,262,344 | B2 | * | 3/2022 | Schoeny | A01B 63/16 |
| 11,343,956 | B2 | * | 5/2022 | Kovach | A01B 71/02 |
| 11,382,266 | B2 | * | 7/2022 | Anderson | A01C 7/205 |
| 2004/0061493 | A1 | * | 4/2004 | Fishburn | G01P 3/443 324/207.22 |
| 2004/0155649 | A1 | * | 8/2004 | Kloos | G01P 3/487 324/207.2 |

(Continued)

*Primary Examiner* — Jamie L McGowan
(74) *Attorney, Agent, or Firm* — McKee, Voorhees & Sease, PLC (57) ABSTRACT

A seed planter is provided with a plurality of single or paired discs with each pair adapted to form furrows to receive seeds. Each disc is provided with a sensor to detect rotational speed of the disc. Each sensor transmits a signal corresponding to the rotational speed of the disc to a tow vehicle having a control system which compares the disc rotational speed to the tow vehicle travel speed. If the disc rotational speed drops below a predetermined value relative to the vehicle speed, this is indicative of disc plugging and/or furrow smearing, both of which are undesirable, such that corrective action can be taken by the operator of the vehicle or an autonomous vehicle.

8 Claims, 7 Drawing Sheets

(56) References Cited

U.S. PATENT DOCUMENTS

| | | | |
|---|---|---|---|
| 2006/0124411 A1* | 6/2006 | Redgrave | B60T 8/329 |
| | | | 188/218 XL |
| 2013/0289933 A1* | 10/2013 | Hess | G01P 21/02 |
| | | | 702/145 |
| 2014/0232377 A1* | 8/2014 | Maier | G01P 3/44 |
| | | | 324/207.13 |
| 2016/0054351 A1* | 2/2016 | Dunbar | G01P 13/045 |
| | | | 324/207.25 |
| 2016/0088787 A1* | 3/2016 | Connell | A01B 76/00 |
| | | | 701/33.9 |
| 2017/0176488 A1* | 6/2017 | Koh | G01P 1/026 |
| 2018/0031595 A1* | 2/2018 | Yasuhara | B60T 8/3225 |
| 2019/0101565 A1* | 4/2019 | Buchwitz | G01P 3/488 |
| 2020/0107498 A1 | 4/2020 | Anderson et al. | |
| 2020/0340215 A1* | 10/2020 | Harnetiaux | A01C 7/16 |
| 2022/0018404 A1* | 1/2022 | Philpott | F16D 51/00 |
| 2022/0084330 A1* | 3/2022 | Sakaguchi | G01P 13/04 |
| 2022/0187099 A1* | 6/2022 | Tiede | B60B 7/066 |
| 2022/0326051 A1* | 10/2022 | Winer | G01D 5/2013 |

\* cited by examiner

ROTATIONAL SPEED SENSORS FOR AGRICULTURAL SEED PLANTER

FIELD OF THE INVENTION

The present invention relates to agricultural row planters and seeders, and specifically to sensors for monitoring rotational speed of the furrow opening discs during operation in the field.

BACKGROUND OF THE INVENTION

Modern agricultural row planters and other agricultural seeding equipment typically utilize a single or a pair of rotatable or rolling, angled discs to form a seed trench or furrow into which the seed is to be deposited. These conventional disc openers typically utilize a concave or flat blade mounted on a hub with rivets or bolts and having a central bearing. Most row crop planters and seeders use a dual blade assembly, with the blades being disposed at opposing angles so as to form the seed furrow as the row planter or seeder is towed through the field by a tractor or autonomous vehicle. The blades open the furrow by pushing the soil laterally away from the center of the blades or discs, and firm the soil on the sidewalls of the furrow so as to maintain the furrow profile while the seed is dispensed into the furrow at desired depth and with desired spacing by conventional seed meters. Then closing wheels or discs on the planter pull the soil back into the furrow to cover the seed.

Under ideal or preferred planting conditions, the disc openers roll through the soil to move or push the soil to the side and thereby create a V-shaped seed furrow having opposite firmed-soil sidewalls. If the soil is too dry, the furrow sidewall can crumble and fall back into the trench before the seed is deposited. Dry soil also may not create sufficient frictional force on the discs or blades to maintain proper rotational speed, which results in sliding of the discs, rather than rotation or rolling of the discs. When discs slide through the dry soil, the disc pushes loose soil and debris forwardly, which leads to plugging and malfunction of the row unit or seeder. Such sliding of the discs thus prevents planting of the seeds at the proper depth and/or spacing. Proper seed depth and spacing is critical to plant growth and yield. Thus, sliding of the discs due to dry soil is undesirable and can produce yield loss, and thereby reduce profitability of the farming operation.

When the furrow opening discs are operated in soil that is too wet, the discs can start to slide, rather than roll through the soil. This disc sliding due to wet soil, produces a soil condition in the furrow sidewalls called "smear." The wet soil sliding of the discs also pushes soil and debris ahead of the unit, causing plugging and inaccurate seed depth and spacing.

Also, seeds planted in furrows having sidewall smear may develop a condition known as "hatchet roots" or "Rootless Corn Syndrome." Hatchet roots cannot grow through the smeared furrow sidewall, thus precluding or inhibiting the plant from gaining complete access to moisture and nutrients needed to produce optimum yield.

Sidewall smear is very difficult to detect. Soil types and conditions greatly affect how and when sidewall smear starts in a furrow, such that detecting soil moisture is not a viable solution to the sidewall smear problem. Maintaining correct rotational speed of the furrow opening discs minimizes or eliminates sidewall smear.

Therefore, the primary objective of the present invention is the provision of a method and means for detecting rotational speed of the seed furrow opening discs during operation in the field.

Another objective of the present invention is the provision of a method and means for maintaining optimal rotational speed of the opener discs in relation to the tow vehicle speed.

A further objective of the present invention is the provision of a method and means for identifying the start of sidewall smear.

Still another objective of the present invention is the provision of a method or means of detecting initial or preliminary plugging of the seed furrow opening discs on an agricultural planter.

Yet another objective of the present invention is the provision of sensors adjacent furrow opening discs on a row unit planter assembly or seeding equipment which determines the rotational speed of the discs and sends a corresponding signal or data for comparison to the speed of the towing vehicle.

A further objective of the present invention is the provision of a method of monitoring the rotational speed of agricultural furrow opening discs.

Another objective of the present invention is the provision of a method of eliminating or minimizing plugging of furrow opening discs on a seed planter.

Yet another objective of the present invention is a provision of a method of precluding or eliminating or minimizing furrow sidewall smear during seed planting operations.

These and other objectives will become apparent from the following description of the invention.

SUMMARY OF THE INVENTION

A seed planter, such as a planter row unit assembly, is provided with single disc or a pair of rotatable discs to open a furrow for seed planting, with a sensor on each disc to sense the rotational speed of the disc. Each sensor is mounted adjacent a concave side of the disc. The sensor detects rotation of the disc hub fasteners or other indicia on the disc. The sensors transmit data corresponding to the rotational speed of the discs to the tow vehicle for comparison to the tow vehicle speed. If the disc rotational speed is less than the tow vehicle ground speed, this is an indication that the discs are not rotating at optimal speed due to plugging and/or soil smearing.

The method of the present invention monitors operation of the seed planter, including determination of the rotational speed of the left and right seed furrow opening discs, or single disc and comparing the disc rotational speed to the travel speed of the planter while the furrows are being formed so as to determine percent of slip of each disc. If disc slip exceeds a predetermined value, this is an indication that ideal seed planting depth and/or spacing may be adversely affected due to plugging of the discs and/or due to furrow sidewall smear, thus reducing harvest yield.

DETAILED DESCRIPTION OF THE INVENTION

Figure 1:
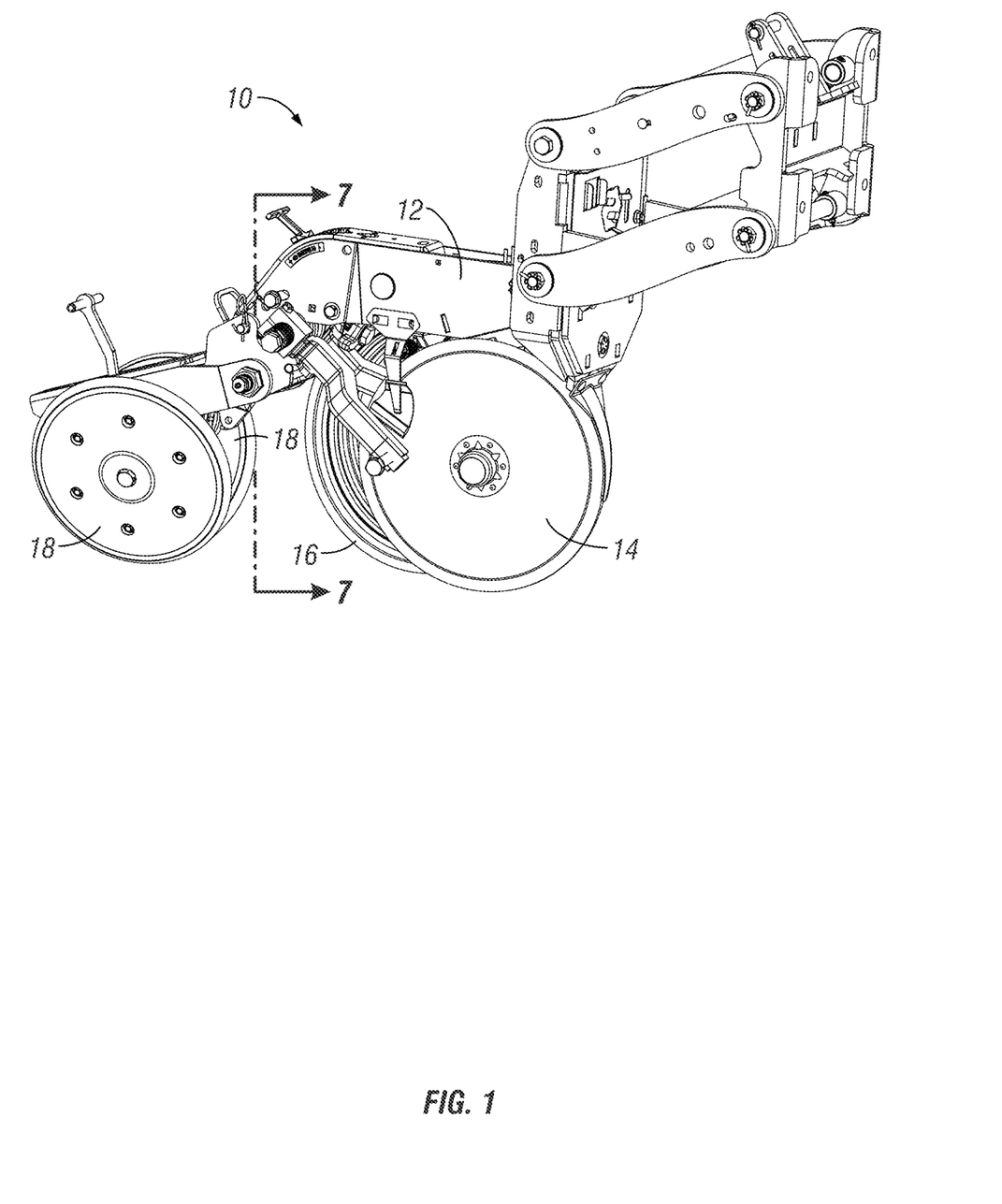
FIG. 1 is a perspective view of a planter row unit assembly according to the present invention.
Figure 2:
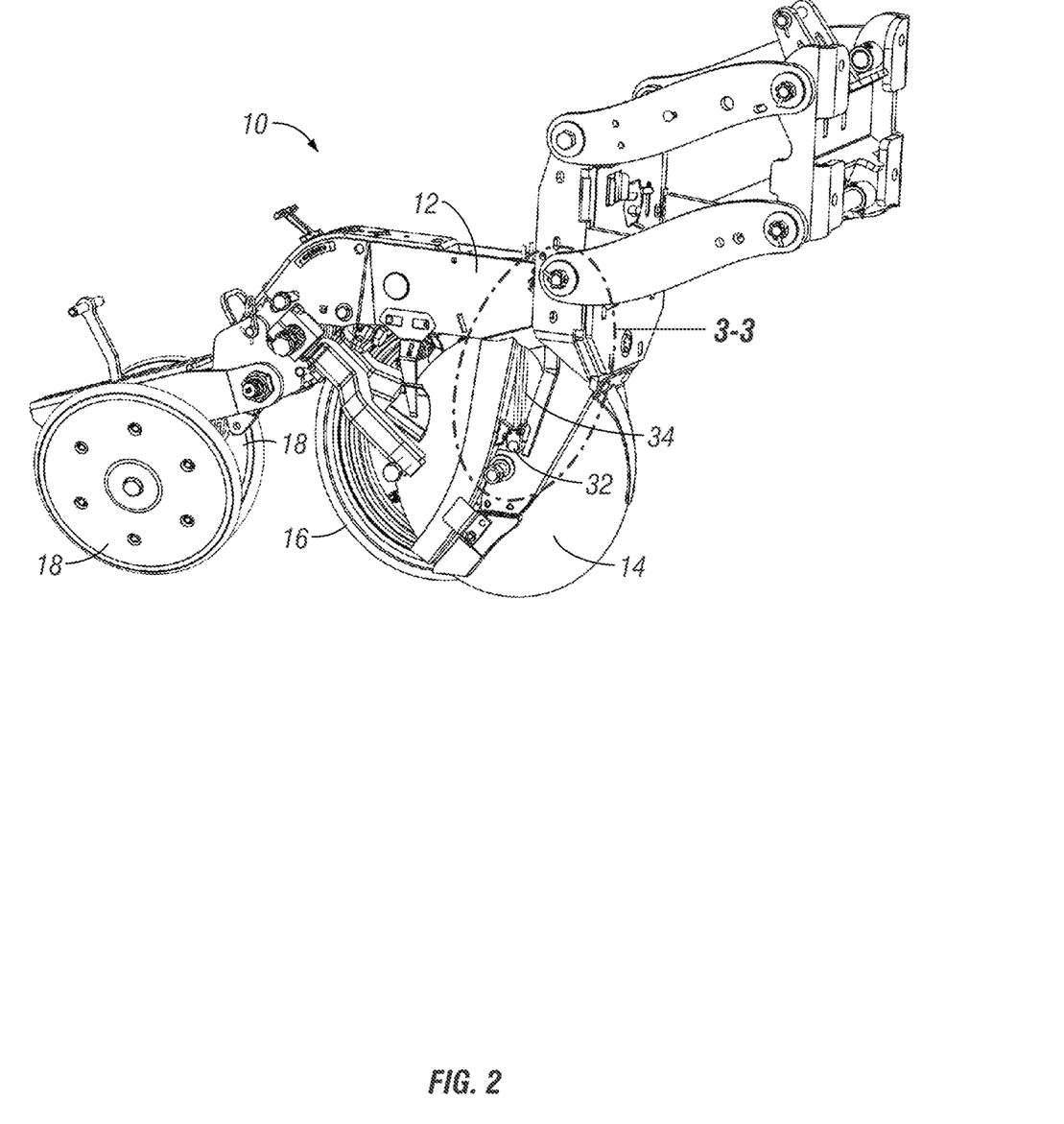
FIG. 2 is another perspective view of the planter row unit assembly, with the right seed furrow opening disc removed to show the right rotational speed sensor.
Figure 3:
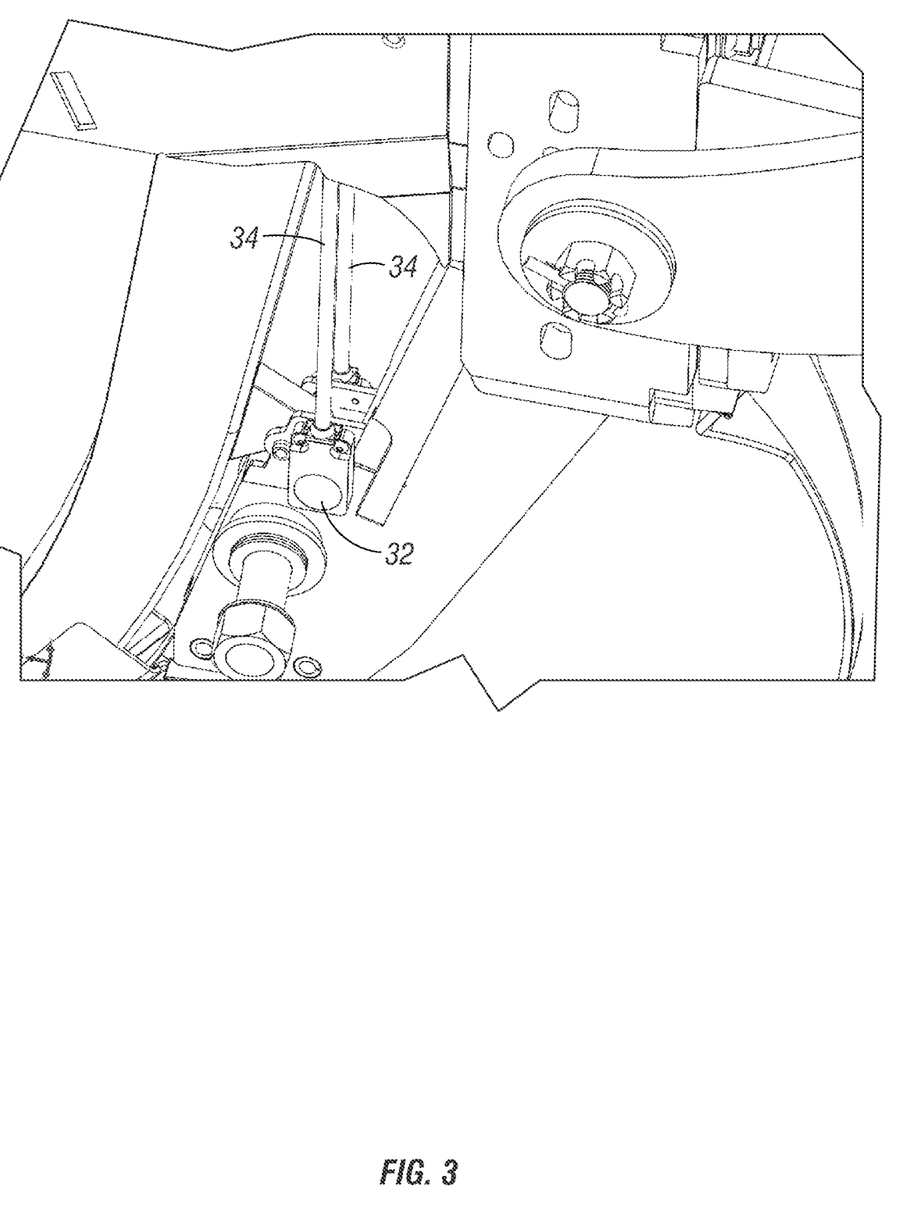
FIG. 3 is an enlarged view take a long line 3-3 of FIG. 2.

The present invention is directed toward seed planting equipment, which is towed through a field by a tractor or autonomous vehicle. The planting equipment includes multiple units, such as the planter row unit assembly 10 shown in FIG. 1, or similar equipment which forms a furrow or trench in the soil into which seeds are deposited at a desired depth and with desired spacing before the furrow is closed. The assembly 10 is mounted to a tool bar, which in turn is connected to the tow vehicle. The tool bar also supports multiple seed hoppers and seed meters associated with each row unit assembly. Each row unit assembly 10 generally includes a frame 12, a single disc or a pair of furrow opening discs 14, a pair of gauge wheels 16 (with the right wheel removed in FIG. 1 for clarity), and a pair of furrow closing wheels or discs 18. This basic structure of the row unit assembly 10 is conventional and operates in a conventional manner when the assembly is attached to a tool bar and is pulled through the field with a tractor or autonomous vehicle.

The left and/or the right opening discs 14 preferably have a curved profile so as to have a concave inner side and a convex outer side. Alternatively, the discs 14 may be flat.

Figure 4:
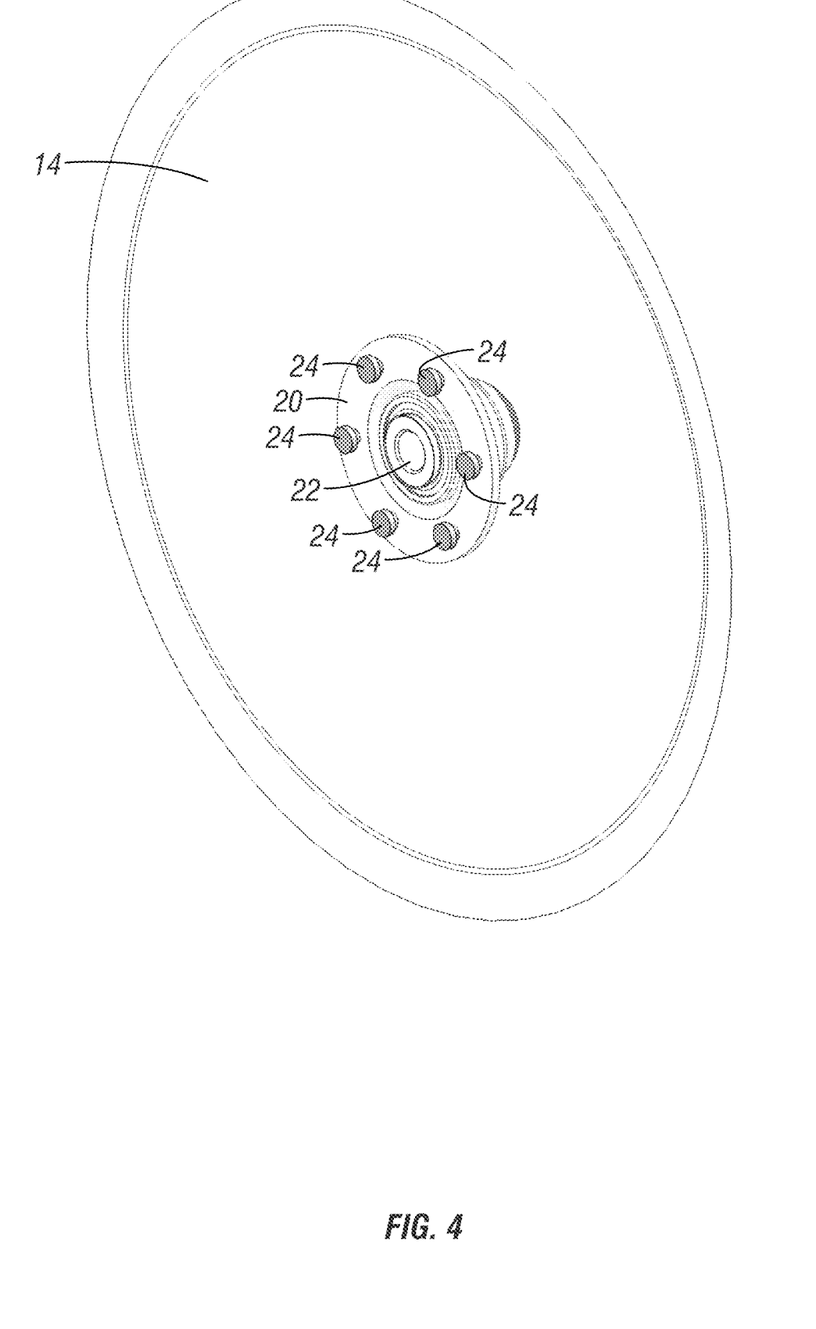
FIG. 4 is a perspective view of the inner, concave side of one of the furrow opening discs.
Figure 5:
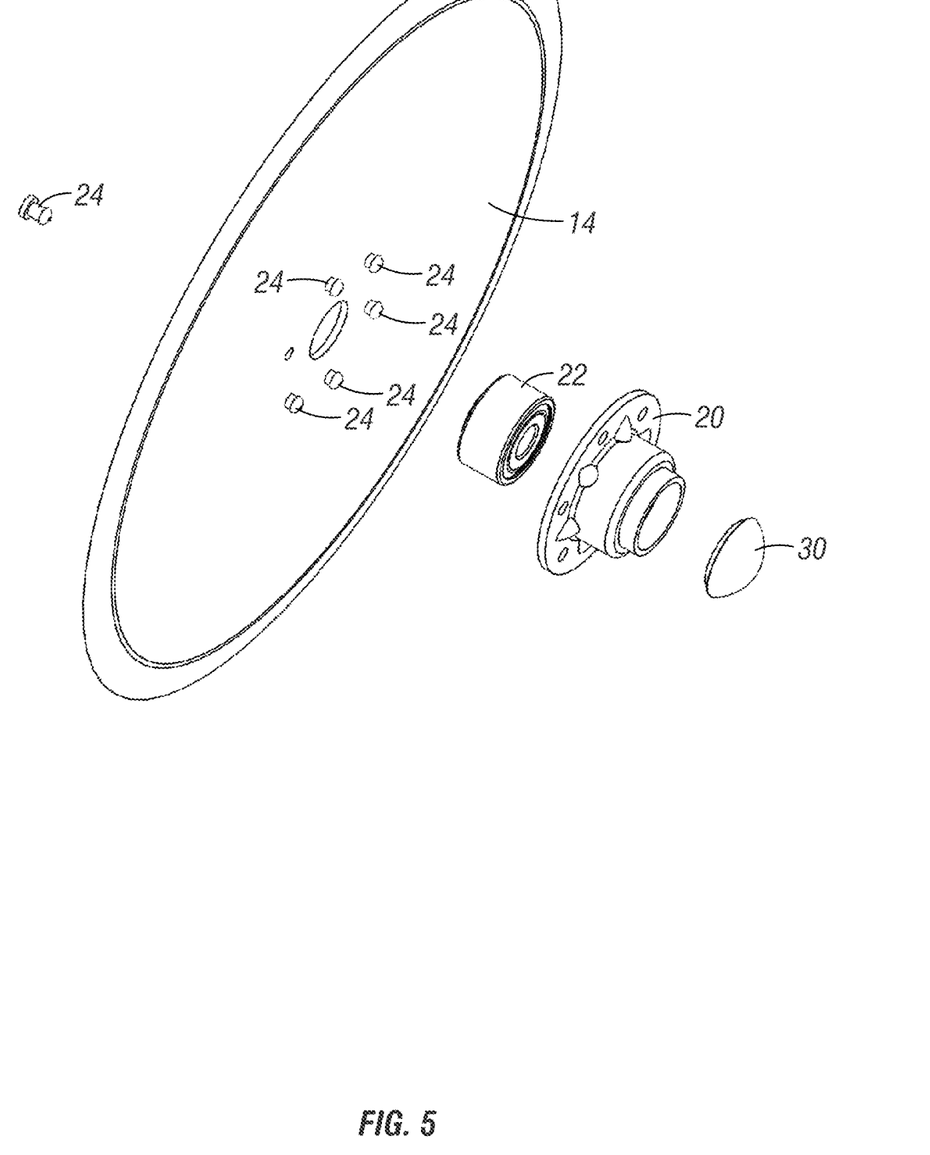
FIG. 5 is an exploded view of the furrow opening disc shown in FIG. 4.
Figure 6:
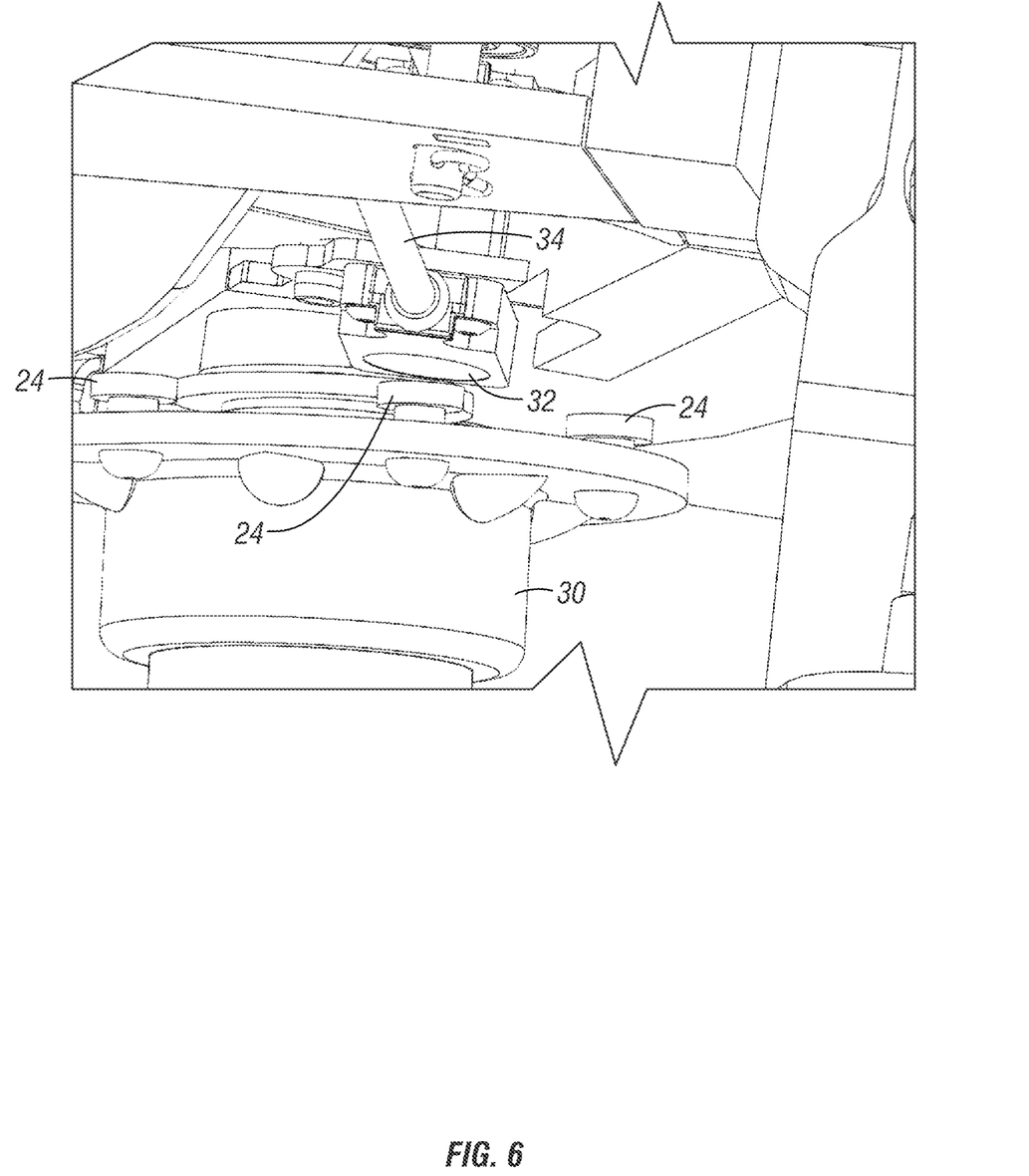
FIG. 6 is an enlarged, upper perspective view showing the rotational speed sensor of the present invention, with the right disc blade removed to show the right sensor.
Figure 7:
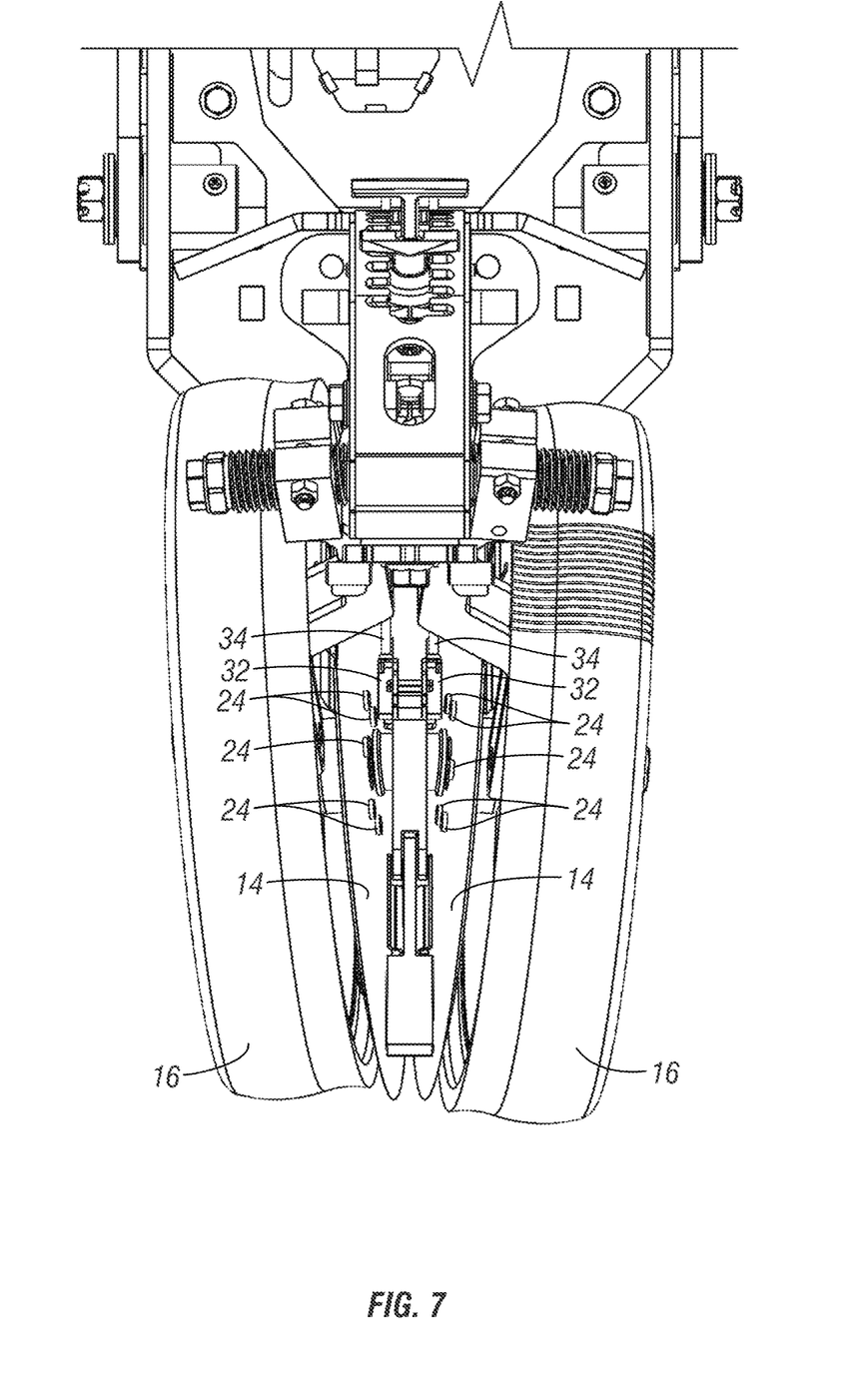
FIG. 7 is an elevation view taken along lines 7-7 of FIG. 1.

As seen in FIGS. 4 and 5, each disc 14 includes a bearing hub 20 with a bearing 22 mounted in the hub. The disc 14 is fastened to the hub 20 using bolts or rivets 24, or other convenient means. A mounting shaft (not shown) extends through a center opening 28 in the disc 14 and into the bearing 22 for rotational support of the discs. A dust cap 30 may be provided on the outer end of the hub 20 to seal the hub and the shaft from dust and other debris. In another embodiment, the shaft and bearing can be mounted on the frame 12 to rotationally support the disc 14.

A sensor 32 is positioned adjacent to the inner side of each disc 14 in alignment with the bolts or rivets 24. The sensor 32 may be mounted in any convenient manner. For example, a sensor arm 34 may be attached to the frame 12 and extend downwardly, with the sensor 32 mounted on the lower end of the arm 34.

In operation, a tractor or other prime mover, such as an autonomous vehicle, pulls the seed planter 10 through the field. The gauge wheels 16 are raised or lowered to control the depth of the discs 14 in the soil. Under normal or preferred operating conditions, the soil is neither too wet nor too dry, such that the left and right discs 14, which are inclined toward one another at their forward edges, push the soil laterally outwardly to form a trench or furrow while rolling or rotating through the soil. The left and right sensors 32 detect or measure the rotational speed of the discs 14 and, wirelessly or by hard wire to an electrical system, transmit the disc rotational speed to a computer or processor, which may be located in the vehicle or may be remotely located. An algorithm programmed into the computer compares the rotational speed of the discs 14 to the ground speed of the tractor or vehicle and calculates a percent slip of each disc 14. The vehicle speed may be determined by conventional means, such as a wheel rotational sensor, by radar, by GPS, by cellular, by direct input by an operator, or other means supplied by the tow vehicle. If the percent slip calculation exceeds a predetermined value, this is an indication that the discs 14 are becoming plugged due to soil which is too dry or too wet, or an indication that the furrow sidewalls are smearing due to excessively wet soil. In either instance, the planting operation may need to cease until soil conditions improve.

In one embodiment, the sensor 32 counts the rivets or bolts 24 as the discs 14 rotate and converts the count into revolutions per minute for comparison to the vehicle speed. As an alternative to counting the rivets or bolts 24, the discs 14 may be provided with some form of indicia, such as one or more notches, pumps bumps, or similar structures which can be sensed by the sensor 32. Also, the sensor 32 may take various forms and functionality, such as optical sensing, electronic sensing, or electromagnetic sensing. Preferably, the sensors 32 are touchless, with a space or gap between the sensor 32 and the disc 14.

The sensors 32 thus provide feedback to an operator in a vehicle, or to an autonomous vehicle, regarding the rotational speed of the discs, and related plugging or smearing problems, such that corrective measures can be taken to ensure proper planting operation.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A planter row unit assembly, comprising:
   a single rotatable disc or a pair of rotatable discs to open a furrow for seed planting; and
   each disc having opposite inner and outer sides;
   each disc having a hub with a plurality of fasteners; and
   a sensor residing adjacent the inner side of the disc and aligned with the fasteners to sense the fasteners as the disc rotates, and to send a signal to an operator if no fastener is sensed.

2. The planter row unit assembly of claim 1 further comprising a frame on which the discs are mounted, and the sensors being mounted to the frame.

3. The planter row unit assembly of claim 2 further comprising an arm for each sensor extending downwardly from the frame, and the sensor being mounted on a lower end of the arm adjacent the disc.

4. The planter row unit assembly of claim 1 wherein the sensor does not touch the fasteners.

5. The planter row unit assembly of claim 1 wherein a gap exists between the fasteners and the sensor.

6. A method of monitoring operation of a seed planter having left and/or right seed furrow opening discs mounted on hubs with fasteners for forming seed furrows in a field, comprising:
   determining whether each disc is rotating or not rotating by counting the hub fasteners on an inner face of each disc as the disc rotates, using a sensor aligned with the fasteners; and
   sending a signal to an operator if no fastener is counted.

7. The method of claim 6 wherein the disc rotation is determined by left and/or right sensors associated with the left and right discs, respectively.

8. An improved agricultural planter having left and/or right furrow opening discs rotationally mounted on hubs with fasteners, and the discs adapted to form a furrow into which seed is dispensed, the improvement comprising:

left and/or right sensors residing adjacent inner faces of the left and right furrow opening discs and each sensor being aligned with the fasteners so as to sense the fasteners when the discs rotate, and each sensor adapted to send a signal to an operator when the fasteners are not sensed and thereby indicate slippage of either disc during field operation of the agricultural planter.

* * * * *